United States Patent [19]

Dahlem

[11] Patent Number: 4,677,936
[45] Date of Patent: Jul. 7, 1987

[54] PROGRESSIVELY MOVABLE HOLDING DEVICE

[75] Inventor: Wolfgang Dahlem, Meersburg, Fed. Rep. of Germany

[73] Assignee: ZF-Herion-Systemtechnik GmbH, Friedrichshafen, Fed. Rep. of Germany

[21] Appl. No.: 865,558

[22] PCT Filed: Sep. 4, 1985

[86] PCT No.: PCT/EP85/00445
§ 371 Date: May 8, 1986
§ 102(e) Date: May 8, 1986

[87] PCT Pub. No.: WO86/01791
PCT Pub. Date: Mar. 27, 1986

[30] Foreign Application Priority Data

Sep. 12, 1984 [LU] Luxembourg ............... 84/00278

[51] Int. Cl.$^4$ ............................ B05B 15/00
[52] U.S. Cl. ................ 118/307; 118/305; 118/DIG. 11; 51/410; 51/429; 182/136
[58] Field of Search ........... 118/305, 307, DIG. 11; 51/410, 429; 182/136, 187

[56] References Cited

U.S. PATENT DOCUMENTS 2,858,105 10/1958 Lucas .
2,906,365 9/1959 Howard .
3,586,127 6/1971 Jones .
3,870,123 3/1975 Izumi ............................ 182/136
4,011,690 3/1977 Braithwaite ..................... 51/410
4,205,694 6/1980 Thompson et al. ............. 118/307

FOREIGN PATENT DOCUMENTS 465292 9/1928 Fed. Rep. of Germany .
1175030 7/1964 Fed. Rep. of Germany .
1254900 11/1967 Fed. Rep. of Germany .
1951162 4/1971 Fed. Rep. of Germany .

Primary Examiner—Shrive P. Beck
Attorney, Agent, or Firm—Hayes, Davis & Soloway

[57] ABSTRACT

The progressively movable holding device comprises two link plate chains (2, 3) which can be separately tightened and loosened in respect to each other and to the workpiece (1) they hold and which are guided by articulated adjusting members (4) at movable distance from each other, wherein the link plate chains (2, 3) are constructed in a mechanical assembly technique easily adaptable to the dimensions of the workpieces (1) by changing the numbers of link plates (5, 6) and which also allow the circulation on a rail section (26) integrally formed on one of the link plate chains (2, 3) of a bracket-type carriage (10) which can serve both as working platform and as implement carrier, for instance, for sandblast pistols. By means of a control and locking device and energy supply designed according to the task to be performed, the holding device can be reversed progressively and by remote control across its main direction and is also easily adaptable to changes in the contour of the workpiece.

16 Claims, 7 Drawing Figures

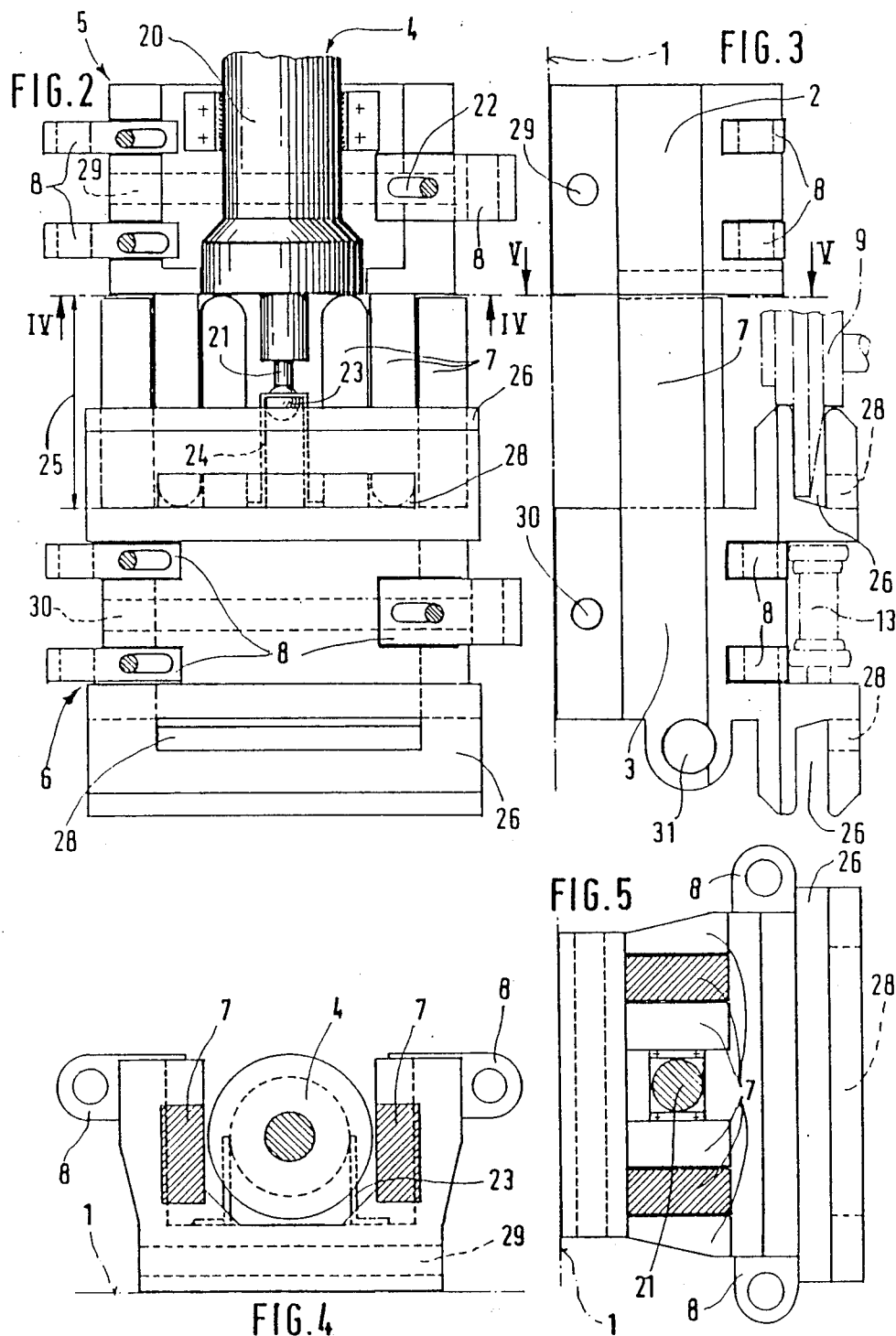

PROGRESSIVELY MOVABLE HOLDING DEVICE

The invention concerns a device according to the preamble of claim 1 and is based on means operated by motor energy such as are known for removing branches of standing trees or the application of insulation to large pipelines. There, the whole holding devices (for example, according to West German AS No. 1,254,900) are progressively movable and actuatable by remote control over the surface of the workpieces (trees) as the work advances. At the same time, although use was made of holding devices formed of individual elements and controllable together, there was no type of construction that proved adequate for firm tool guidance and movement at constant distance along diameters, lengths and contour cross sections that change to varying extents, since a corresponding gear rim was needed and the individual elements were flexible plastic tubes.

This type of construction thus offered no economically reasonable and time-saving possiblity for systematic adaptation to frequently changing shapes and contours of a workpiece and to shifting the longitudinal guides (rails) in transverse direction by remote control as work progressed while maintaining the distance to the workpiece surface, as must be the case, for instance, when using automatic submarine sandblasting machines and coating machines.

The problem to be solved by the invention consists of improving said prior art toward increased adaptabiity to the kinds of workpiece and tasks to be performed and toward variability, mobility and possible remote control even for the intermittent use in difficult surroundings (great heights, under water, hot zones, etc.) while obtaining a more reliable firm guidance at constant distance from the workpiece.

The solution to this problem according to the characteristic part of claim 1 consists specifically in providing a mechanical assembly technique of supporting and tightening elements adaptable to all possible contours and diameters by means of interlocking link plates—chain links of equal size at constant distance to form a reinforceable chain adapted to the working width concerned providing a mechanical assembly technique of supporting and tightening elements adaptable to all possible contours and diameters by means of link plates-chain links of equal size for link chains adapted or adjustable to the respective working scope, thus eliminating the need to limit the use of the holding device similar to workpieces or shapes. In addition an advancing mechanism now included in the link chains provides the possibility of progressive movement through which the whole device can be shifted across the main direction of movement of the tool or of the link chain.

This device can be used on workpieces of both even and streamlined shape. Specially favorable conditions of use result from the adaptability achieved when working on supporting structures for deep-sea platforms, on transmitting poles, bridge piles, etc. where the link chain can be circularly wrapped around the workpieces to be processed, and where the diameters of the pipes often change to a certain extent during the progress of construction. With the device according to the invention, it is possible by briefly loosening the link chains and concomitantly inserting or removing link plates to change quickly and easily the length of the chain within broad limits without the need for new tightening means, controls, etc.

The chain-like assembled link plates with adusting members actuatable by auxiliary energy may even serve as supports, which themselves also assume the guidance of the brackets to be eventually mounted on the holding device and movable in the main direction of the chains, and are progressively transferable likewise by remote control, by means of additional adjusting members, from one work station to the next.

Other embodiments of the invention are given in the sub-claims:

According to claim 2 a specially reliable chain arrangement also adequate for use on vertical surfaces and easily adaptable to different diameters within certain ranges is obtained even without replacement of links.

According to claim 3 a simultaneous utilization of the link plates as rail section for rollers or skids of bracket-type carriages or sleds, etc., which are to be moved in the main direction of the link chain is obtained.

According to claim 4 there is proposed the possibility of tightening each one of the link chains separately, which eliminates undesired total loosensings such as by faulty connections.

According to claim 5 a possibility of reversal acting in transverse direction for progressive movements on a few pairs of link plates by means of articulated adjusting members that relatively movably guide the link chains at limited distances is provided.

According to claim 6 the operation of the brackets moving on the rail section is functionally locked by the tightening means and articulated adjusting members for retaining and/or moving forth the link plate chains so that the bracket-type carriages are conveyable only when the link chains belonging to it are securely stationary.

According to claim 7 an easily applicable driving principle is given for directly driven bracket-type carriages where the propulsion, on account of its form-locking meshing principle in a sprocket chain adjustable to the needed length, is adequate additionally for cases where high clamping forces or friction forces have to be overcome.

According to claim 8 a preferred possibility is shown for activating, in a manner to a great extent independent of the number of link plates per chain, tensional forces that act upon the whole length of the link chain form a central locking and tightening station.

According to claim 9 it is proposed further to reinforce the local contact pressure relative to the workpiece by means of lever or eccentric devices such as an asymmetric configuration of the link plate bottom.

According to claim 10 a simple parallel guidance at changeable distance of both link plate chains is obtained which easily allows the addition or removal of link plates from a given link plate chain.

According to claim 11 a space-saving and effective inclusion of the adjusting members is provided in the link plate chains for progressive movements in which there is no need of a separate protective lining in the area of the cylinder.

According to claim 12 a limited possiblity of altering the length of the link chains and loosening them also without changing the number of plates is obtained.

According to claim 13 an arrangement of the control elements in the device proper that favors the operation is proposed.

According to claim 14 an arrangement of the tightening means for the link chains that improves effectiveness is proposed.

According to claim 15 a possibility of attachment especially favorable for use in points far removed from a source of energy with only one central composed cable or pressure tube is provided.

According to claim 16 the communication with a source of energy and control station obviously can also consist of cables separately guided as needed on the control members, or the energy source and control station can also be directly built on the bracket-type carriage so that then only one composed control cable needs to be guided as remote connection to a remote control center.

The device according to the invention can be designed both in lightweight construction (for instance, only for the transport of tools) and in heavyweight construction (for instance, as platform for persons) and can be attached to round, angular, or flat bodies. In the last case there are needed at the ends of the link chain only corresponding movable or rollable anchorages in relation to the workpiece or the edges thereof.

The invention is explained herebelow with reference to diagrammatic drawings of an embodiment:

FIG. 2 shows a link plate pair in a telescoped state provided with articulated adjusting member.

FIG. 3 shows a side view of FIG. 2.

FIG. 4 shows a bottom view of the link plate designed without guiding rail.

FIG. 5 shows a top view of the link plate equipped with guiding rail.

Figure 1:
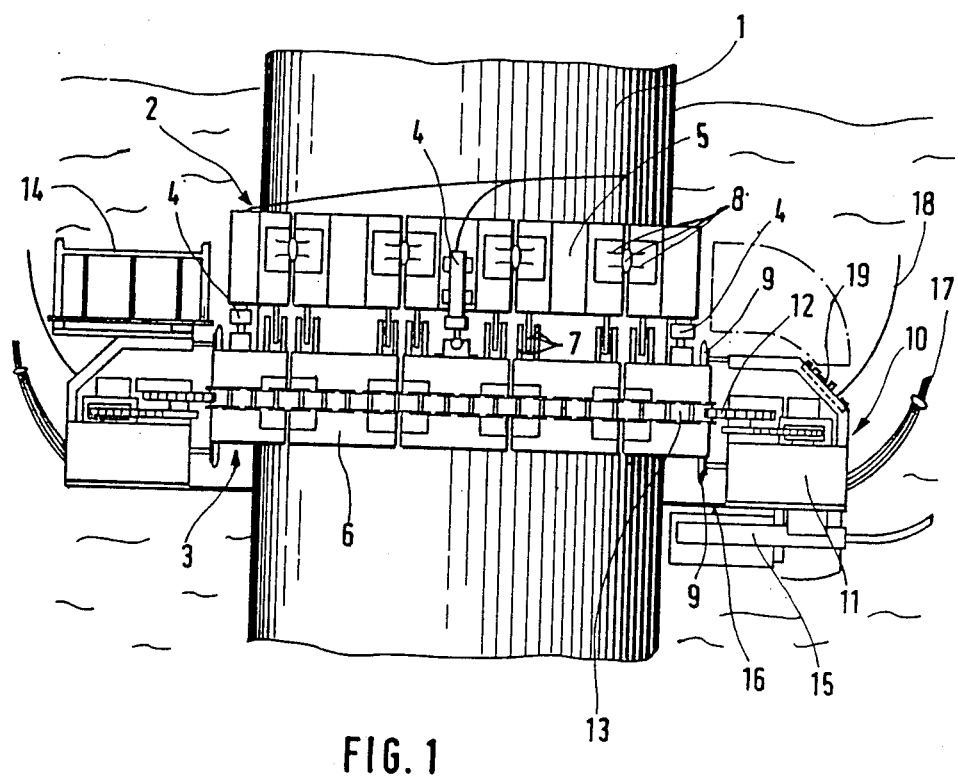
FIG. 1 shows in a simplified illustration a total view of the progressively movable holding device, here equipped with a rotating bracket-type carriage carrying in one case a platform (left) and in another case a surface-cleaning apparatus (such as a sandblaster).

In FIG. 1 the workpiece 1 is assumed to be a large barrel support (such as on an oil platform). A railless link chain 2 is provided over a railed link chain 3 with which it is to be connected across the main direction of the chain peripherally at variable distances by a few articulated adjusting members 4. Here guiding tongues 7 facing each other take from the link plates 5, 6 the limitation in the lateral relative mobility of the link chains 2 and 3. The respective chain lengths proper can be predetermined according to the given workpieces both by the number of link plates 5 and 6 per chain 2, 3 and by fishplates and hinges 8 at limited variable distance on the link plates 5, 6 as connecting members of the individual link plates 5 and 6 in the main direction of the respective chains 2 and 3.

On the edges of the link plate 6, which is railed or is constructed as rail protion and here in the embodiment form the lower link chain 3, there are guided track wheels 9 of bracket-type carriages 10. By means of the hydromotor drive 11, via the pinion 12 of which the support along a roller chain 13 results, the bracket-type carriages 10 can be conveyed by remote control. The roller chain 13 is secured in the outer surface of the railed link plate 6 loosely enough, but only with limited lateral movement, so as to leave sufficient play to the link chain 3 in order to make possible somewhat to loosen transitorily its pressure for the purpose of further movement in respect to the workpiece 1 by loosening the peripheral ropes or chains (not visible in this figure) wound around it even in reversing maneuvers.

As needed, the bracket-type carriage(s) 10 carry either a frame platform 14 or a surface-treatment means 15 (such as sandblasting machine, paint-spraying machine, etc.). In the embodiment, aprons 16 are provided against soiling between the bracket-type carriage 10 and the surface-treatment means 15. Should an additional safeguard against a fallout be required besides the energy and control cable 17, this can be provided by a separate holding rope 18. A control board 19 that here moves along on the bracket-type carriage allows additionally for the control of the operation of the bracket-type carriage 10 and/or surface-treatment means 15 at the place of use.

In FIG. 2 is seen in telescoped state one of the pairs of link plates 5, 6 that form the link chains 2,3. By means of the articulated member 4 retained here with its housing 20 on the railless link plate 2, both link plates 5, 6 are herein the drawing as closely drawn to each other as allowed by the guiding tongues 7 that face each other or the piston rod 21. When the piston rod 21 is drawn out only the outermost ends of the guiding tongues 7 would stay side by side and the distance between the link plates 5, 6 would then be accordingly larger. On the side edges of each link plate 5, 6 fishplates 8 are inserted which are flexibly connectable with adequately placed counter-fishplates (not shown) of adjacent link plates 5, 6 by means of the hinge pins plugged through the two fishplates. Since the fishplates 8 are held in a slot fastening 22, it is possible when assembling to modify the distances between the link plates 5, 6 in the main direction of the link chain, as may be needed and without changing the number of plates.

The piston rod 21 ends in a spherical joint 23 the holding means 24 of which is here stationary on the railed link plate 6, but the spherical joint 23 is centered approximately in the middle of the minimum distance 25 of the two link plates 5, 6. On the front side of the railed link plate 6 remote from the workpiece 1 there are integrally formed two upright U-sections 26 the openings of which point away from each other. In said sections 26 run the wheels 9 of the bracket-type carriage 10 not visible in this figure. In the outer leg of the U-section a slot 28 is here recessed in order to make it possible to prevent an obstruction of the U-section 26 caused by its self-cleaning action by means of the rollers 9.

In FIG. 3 bores 29, 30 for ropes (not shown here) are inserted on the rear side of the link plates 5, 6 facing the workpiece 1 through which the link chains 2 and 3 can be pressed independently of each other against the workpiece 1 and can be briefly loosened for further movement of the individual link chains. A rod (not shown) which can tighten or hold straight the link chains 2, 3 before even workpieces 1 can be passed through an eye 31 formed on the lower edge of the railed link plate 6.

In FIG. 4 the position of the articulated adjusting member 4 can be seen within the railless link plate 5 in a U-shaped recess between the sidewalls into which also extend the guiding tongues 7 of the opposite link plate 6.

In FIG. 5 the interlocking of the guiding tongues 7 is seen again from above. This cast plate has a rectangular inner cross section and the guiding tongues 7 are situated between the bores 29, 30 for the ropes and the fishplates 8.

Figure 6:
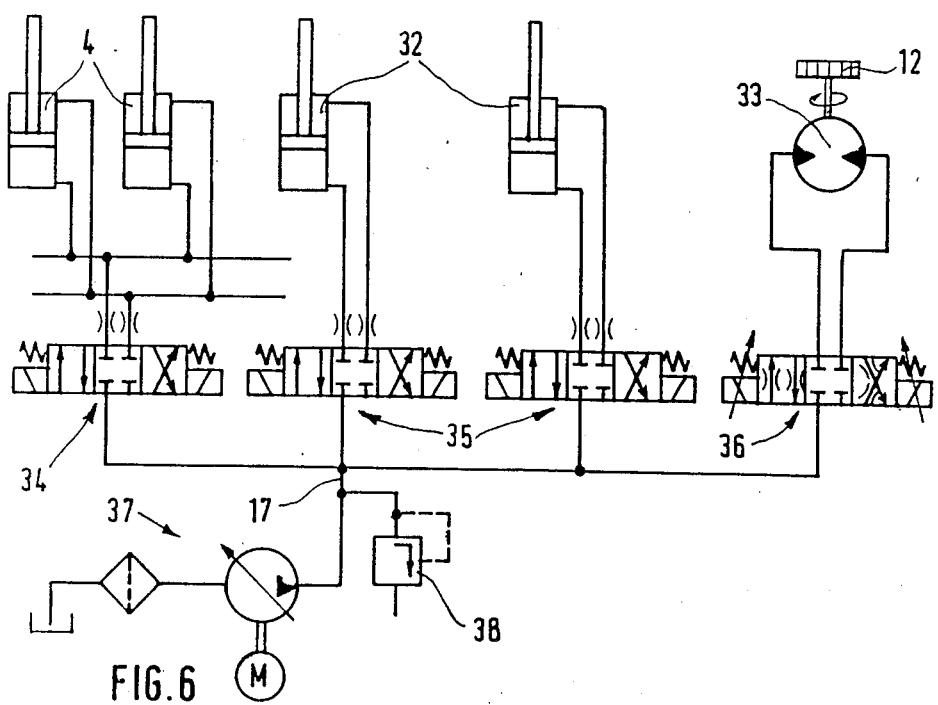
FIG. 6 shows a simplified hydraulic circuit diagram for the tightening and articulated adjusting members as part of a control and locking device.

In FIG. 6 the control and locking device for the articulated adjusting member 4, for the rope winder cylinder 32, and for the bracket-type driving engines 33 is illustrated which can here be loaded via electromagnetically switchable 4/3 directional valves 34, 35 or a proportional valve 36 for the engine 33 according to a conventional electrical locking device not shown of a conventional hydraulic unit 37. When used under water there would be attached, for instance, to a bracket-type carriage 10, only the valves 34, 36 and a pressure-relief valve 38 in the area of the control board 19.

All the remaining control parts could be above water and the adjusting members 4, 32, 33, etc. could also be remotely controlled from above. Aside from electropipes all that would be needed for this would be to pass a hydraulic pipe via the energy and control cable 17 to the holding device 2, 3.

Figure 7:
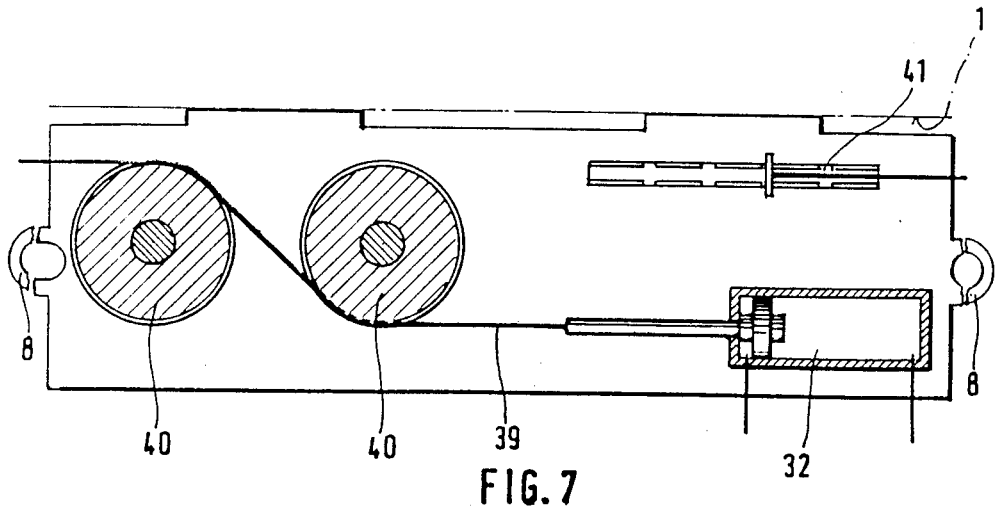
FIG. 7 shows a tightening and locking device for encircling ropes of chains having integrated a rope-tightening device.

According to FIG. 7, the tightening device for the rope or chain 39, can be designed instead of a normal link plate 5, 6 to consist of the rope winder cylinder 32, reversing rollers 40 and a rope anchoring 41 of adjustable length for the other rope end that has been anchored. All is assembled together on a plate insertable link one of the link plates 5, 6 in the respective link chain 2 or 3.

The respective rope 39 is brought of the same distance from the workpiece 1 as the bores 29 and 30 through which it is passed by means of the reversing rollers 40. In workpieces of very large or complicated contour, the ropes are tightened with in excess of two rope winder cylinders 32.

To advance the holding device in transverse direction, one of the link chains 2 or 3 is loosened from the workpiece 1 by releasing the rope winder cylinder 32, and at the same time also by springs, for instance, in the bearing surface of the link plates, before the link chain is drawn toward or away from the link chain still retained on the workpiece 1 by a change of position of the articulated adjusting members 4. By continued repetition of such shifts in alternation, the progressive movement of the whole holding device together with the bracket-type carriage 10 circulating thereon is obtained. To prevent derailment, the driving engine 11 may be switched on only when the rope winder cylinders 32 of both link chains 2 and 3 have correct position.

REFERENCE NUMERALS 1 workpiece
2 railless link chain
3 railed link chain
4 articulated adjustment member
5 link plate of 2
6 link plate of 3
7 guiding tongue
8 fishplate or hinge
9 track wheel
10 bracket-type carriage
11 drive
12 pinion
13 roller chain
14 frame platform on 10
15 surface-treatment device (such as sandblaster) on 10
16 apron
17 energy and control cable
18 holding rope
19 control board
20 housing of 4
21 piston rod of 4
22 slot fastening of 8
23 spherical joint
24 holding means of 23
25 minimum spacing of 5 and 6
26 rail section
27 opening
28 slot
29 bores for ropes in 5
30 bores for ropes in 6
31 eye for rod
32 rope winder cylinder
33 bracket-type driving engine
34 4/3 directional valve for 4
35 4/3 directional valve for 32
36 proportional valve for 33
37 hydraulic unit
38 pressure-relief valve
39 tightening rope or chain
40 reversing roller
41 rope or chain anchoring

I claim:

1. A progressively movable holding device (2, 3) especially utilizable as tool or implement carrier (10) for treatment and/or inspection processes or workpieces (1) of larger or extended surfaces or of difficult access such as cast-iron pipes,
   having a number, adjustable to a predetermined processing length, of variably movable individual elements supported against the surface or contour of said workpiece (1),
   upon which elements both said holding device (2, 3) itself and said tool or implement carrier (10) are separately transportable by remote control to alternating working positions;
   wherein tightening elements (4, 12) actuatable by auxiliary energy provide for progressive movement from one working position to the next,
   and said tool carrier (10) is conveyable along said individual elements, characterized in that
   said individual elements consist of link plates (5, 6) retained together in releasable hinges and joined together to form two link chains (2, 3) at variable distance,
   said link plates (5, 6) are each separately held at a constant distance in respect to said workpiece,
   being themselves directly designed as double rails (26) for said tool or implement carrier (10) movable therealong and
   there being provided for progressive movement a partly transitory loosening and retightening of at least a few link plates (5, 6) by means of peripheral tightening elements (4, 32) actuatable by remote control.

2. A device according to claim 1, characterized in that
   two link chains (2, 3) guided in parallel can also be limitedly movably guided in respect to each other across their main direction both by interlocking guiding tongues (7) on the sides facing each other of said link plates (5, 6) and by corresponding articulated adjusting members (4); and
   for their advance, said articulated adjusting members (4) can be stretched or pushed in transverse direction relative to said workpiece (1) and also to the respective adjacent link chain (2 or 3) retained by tightening and supporting elements (21 and 32).

3. A device according to claim 1, characterized in that at least one of said link plate chains (2 or 3) is designed on the surface or edge of the individual link plates (5, 6) remote from said workpiece (1) as part of a rail (26), whereby after reaching a working position a closed rail for rollers (9) of said bracket-type carriage (10) results on the whole width or on the whole periphery thereof.

4. A device according to claim 1 characterized in that each one of said link chains (2, 3) can be blocked or loosened in respect to said workpiece (1) by locking or tightening means (32, 27, 28) of its own, which in the normal case is controlled and can only be alternately loosened via a common locking system (34, 35).

5. A device according to claim 1, characterized in that said link chains (2, 3) are interconnected by means of articulated adjusting members (4) at variable distance; and each link chain (5, 6) is alone separately movable with limited distance, only after loosening the locking and tightening means (4, 21, 32, 39, 40, 41) under lift limitation and parallel guidance, by corresponding guiding tongues (7) in respect to the other link chain (2 or 3) that is locked in the tme.

6. A device according to claim 3, characterized in that said bracket-type carriage (10) is itself also actuatable by remote control via its own driving engine (11), which in addition is secured in respect to said locking and tightening means (4, 21, 32, 39, 40, 41) by a control and locking system (34, 35) and allows a traveling operation only when a working position has been reached by means of said articulated adjusting member (4) and a safety blocking results.

7. A device according to claim 6, characterized in that said driving engine (11) has, inserted in said bracket-type carriage (10), hydromotors which mesh, each one with a pinion (12), in a sprocket wheel (13) which stresses said link chains (2, 3) in their main direction and is lockable in working position.

8. A device according to claim 1, characterized in that said locking and tightening means (4, 21, 32, 39, 40, 41) act upon ropes or chains (39) which jointly shift said workpiece (1) and said link chains (2, 3) or press said link plates (5, 6) against said workpiece (1).

9. A device according to claim 1, characterized in that clamping elements are provided between said link plates (5, 6) and said workpiece (1) or said link plates (5, 6) themselves are designed as clamping elements with lever or eccentric mechanisms for reinforcement of contact pressure in the working position.

10. A device according to claim 1, characterized in that said link plates (5, 6) are guided and held by guiding tongues (7) that extend respectively in an inner space of said opposite link plate (5 or 6), at a distance with narrowly limited axial movement in respect to each other but remain transversely movable to a greater extent in respect to the main axis of said link plate chain (2, 3).

11. A device according to claim 10, characterized in that between said guiding tongues (7) some link plates (5 or 6) have fluid drums designed as articulated adjusting members (4) while the base end is connected with limited flexiblity with one link plate chain (5, 6) and the piston rod end (21) thereof with said other link plate (5 or 6).

12. A device according to claim 1, characterized in that on the individual link plates (5, 6) fishplates (8) secured at variable distance are present in direction of the main axis of said link chain (2, 3) as hinges the spacings and cross bores of which correspond with other fishplates (8) on the adjacent link plates (5 or 6) and together with insert bolts form releasable hinges.

13. A device according to claim 1, characterized in that said bracket-type carriage (10) carries along in addition at least one control part for the control and locking means (11, 34, 35, 36).

14. A device according to claim 1, characterized in that a tightening device (32) for the ropes or chains (39) is integrated as a specially designed link plate (5, 6) in said link chain (2, 3) which has thereon on one side a firm rope anchorage (41) of one of the rope ends (39) and on the other a rope winder device (32) re-adjustable by energy adjusting member or lever for a loose rope end (39).

15. A device according to claim 1, characterized in that said tightening devices (4, 32) are activatable via electrohydraulic control members (34, 35, 36) while the connection to an energy source and control station (37) consists of only one central composed cable (17) of long-distance connection, which ends in said bracket-type carriage (10) from which individual tightening devices (4, 32) can be fed via short separate hoses.

16. A device according to claim 1, characterized in that a hydraulic unit (37) is directly built on said bracket-type carriage (10), and the whole device is controlled via a remote-control cable (17), which likewise ends in said bracket-type carriage (10).

* * * * *